United States Patent [19]
Yang

[11] Patent Number: 5,309,261
[45] Date of Patent: May 3, 1994

[54] OPTICAL SYSTEM FOR LASER BEAM SCANNER

[75] Inventor: Keun Y. Yang, Seoul, Rep. of Korea

[73] Assignee: Goldstar Co., Ltd., Seoul, Rep. of Korea

[21] Appl. No.: 907,037

[22] Filed: Jul. 1, 1992

[30] Foreign Application Priority Data

Jul. 3, 1991 [KR] Rep. of Korea ............ 11253/1991

[51] Int. Cl.$^5$ ............................................ G02B 27/10
[52] U.S. Cl. ........................................ 359/19; 359/17
[58] Field of Search ............... 359/17, 19, 205, 206, 359/207, 208, 565

[56] References Cited

U.S. PATENT DOCUMENTS 4,585,297  4/1986  Hamaguchi et al. ............... 359/17
5,124,821  6/1992  Antier et al. ...................... 359/19

FOREIGN PATENT DOCUMENTS 2434414  2/1975  Fed. Rep. of Germany.
59-2022409  11/1984  Japan.

OTHER PUBLICATIONS

European Search Report and Annex.
"Recent Developments in Diffractive Optics" by K. Firth, GEC Journal of Research, vol. No. 3 No. 1, 1985, pp. 1 ∝ 10, Jun. 1985.
"Holographic Zone Plates for f.θ and Collimating Lenses" by Y. Ono et al., Applied Optics, vol. 25 No. 5, Mar. 1, 1986, pp. 794–797.
English language abstract of Japanese Appln. No. 59-121371, Jul. 1984.

*Primary Examiner*—Richard A. Bertsch
*Assistant Examiner*—Charles G. Freay

[57] ABSTRACT

An optical system for a laser beam scanner, is capable of reducing the manufacturing cost by substituting a holographic optical element for a toric lens, comprising a light source for generating a laser beam, a rotary polyhedron for collimating the laser beam from the light source and focusing and reflecting the laser beam; and a compensating lens array, including a concave lens for receiving the laser beam from the rotary polyhedron and a convex lens attached with a holographic optical element, for compensating the laser beam reflected from the rotary polyhedron and scanning the compensated laser beam to a drum.

3 Claims, 4 Drawing Sheets

OPTICAL SYSTEM FOR LASER BEAM SCANNER

BACKGROUND OF THE INVENTION

1. Field of the Invention

The present invention relates to an optical system for a laser beam scanner of a laser printer, and more particularly to an optical system for a laser beam scanner which is capable of reducing the manufacturing cost by use of a holographic optical element in a compensating lens array.

2. Description of the Prior Art

A conventional optical system for use in a laser beam scanner of a laser printer is illustrated in FIG. 1. As shown in FIG. 1, the conventional optical system comprises a light source 1 for generating a laser beam, a collimator 2 for allowing the laser beam from the light source 1 to advance in parallel, a cylindrical lens 3 for focusing the laser beam which has passed through the collimator 2, a rotary polyhedron 4, rotatably mounted by means of a motor (not shown), for reflecting the laser beam which has been focused by the cylindrical lens 3 toward a scanning plane of a predetermined anyle, and a compensating lens array for preventing the laser beam reflected at the polyhedron 4 from moving perpendicularly with respect to the scanning plane and scanning the laser beam on a drum 7 at a uniform speed.

The compensating lens array includes a concave lens 5 and a toric lens 6.

The toric lens 6 has a toric surface, as shown in FIGS. 2A and 2B, in which the radiuses of curvature R1 and R2 at a scanning plane and the radiuses of curvature R1' and R2' at a plane perpendicular to the scanning plane have the relationships of R1≠R1' and R2=R2', respectively.

In such a conventional optical system, a laser beam 8 generated from the light source 1 is collimated by the collimator 2 and focused on the cylindrical lens 3. The focused laser beam is reflected to the scanning plane depending upon the rotation of the rotary polyhedron 4 and scanned on the drum 7 through the compensating lens array 5 and 6.

At that moment, the compensating lens array 5 and 6 prevents the laser beam 8 from slightly moving in the direction perpendicular to the scanning plane, depending upon the gradient of the mirror surface of the rotary polyhedron 4 and executes a F−θ compensation so that the scanning speed of the laser beam can be maintained uniform when the laser beam is scanned on the drum 7. In the F−θ compensation, "F" is indicative of an effective focus length of the toric lens 6 and θ is indicative of a rotational angle of the rotary polyhedron 4.

Such a conventional optical system, however, has a disadvantage in that since a toric lens having a toric surface is required in the compensating lens array in order to prevent the laser beam from slightly moving in the direction perpendicular to the scanning plane and to maintain the scanning speed on the drum uniform, the manufacturing cost of the optical system is high.

SUMMARY OF THE INVENTION

Accordingly, it is an object of the present invention to provide an optical system for use in a laser scanner of a laser printer which is inexpensive in manufacturing cost by constituting the compensating lens array with a holographic optical element instead of the toric lens.

Other objects and further scope of the applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an optical system for use in a laser scanner of a laser printer which includes a light source for generating a laser beam, a rotary polyhedron for reflecting the laser beam from the light source, and a compensating lens array having a concave lens and a convex lens attached with a holographic optical element for preventing the laser beam reflected at the rotary polyhedron from moving in the direction perpendicular to a scanning plane and scanning the laser beam on a drum at a uniform scanning speed.

The holographic optical element is manufactured such a manner that a first and a second cylindrical lenses are disposed such that their powers cross at right angles, the distance between the focus of the first cylindrical lens and the holographic optical element comes to a half of the radius of curvature of the toric lens at the scanning plane, and the distance between the focus of the second cylindrical lens and the holographic optical element comes to a half of the radius of curvature of the toric lens at a plane perpendicular to the scanning surface, thereby determining the focus of the holographic optical element.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A and 5B are explanatory views illustrating the manufacturing process of the holographic optical element of the present invention, in which:

FIG. 5A is a view showing the distance between the focus of a cylindrical lens and the holographic optical element at a plane perpendicular to the scanning plane; and FIG. 5B is a view showing the distance between the focus of a cylindrical lens and the holographic optical element at a scanning plane.

DESCRIPTION OF THE PREFERRED EMBODIMENTS

Figure 3:
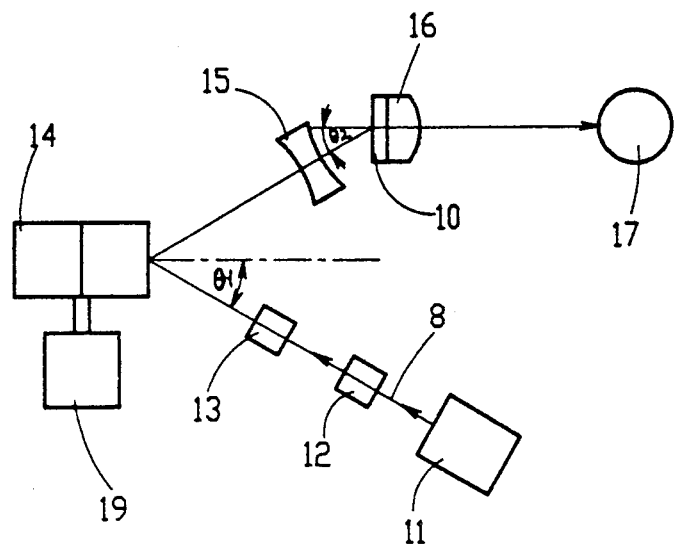
FIG. 3 is a side elevational view showing an optical system for use in a laser beam scanner according to the present invention.
Figure 4:
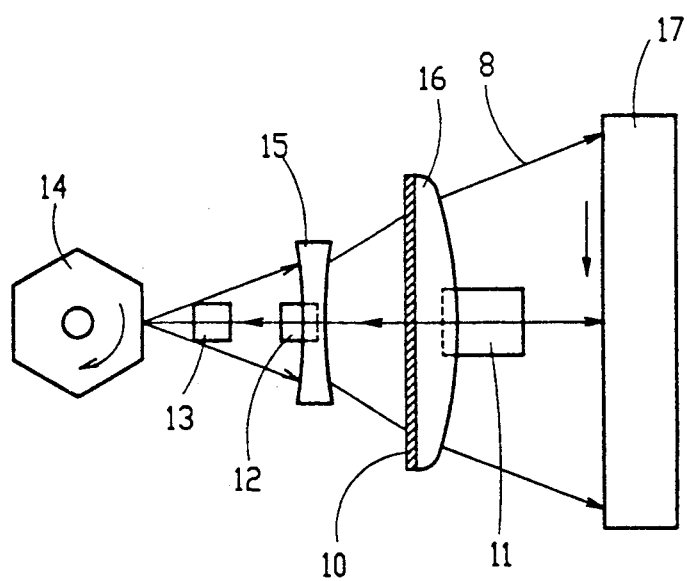
FIG. 4 is a plane view of the optical system of FIG. 3.

Referring now in detail to the drawings for the purpose of illustrating preferred embodiments of the present invention, the optical system for use in a laser beam scanner of a laser printer as shown in FIGS. 3 and 4, comprises a light source 11 for generating a laser beam, a collimator 12 for collimating the laser beam 18 from the light source 11 so as to be advanced in parallel, a cylindrical lens 13 for focusing the laser beam 18 which has passed through the collimator 12, a rotary polyhedron 14 rotatably mounted by a motor 19 for reflecting the laser beam which has been focused by the cylindrical lens 13 toward a scanning plane of a predetermined scanning plane, and a compensating lens array including a concave lens 15 upon which the laser beam 18 reflected at the rotary polyhedron 14 is incident and a convex lens 16 attached at its incident surface with a holographic optical element 10, for preventing the laser beam being scanned by the rotary polyhedron 14 moving in the direction perpendicular to the scanning plane and allowing the laser beam 18 to be scanned on a drum 17 at a uniform speed.

Figure 1:
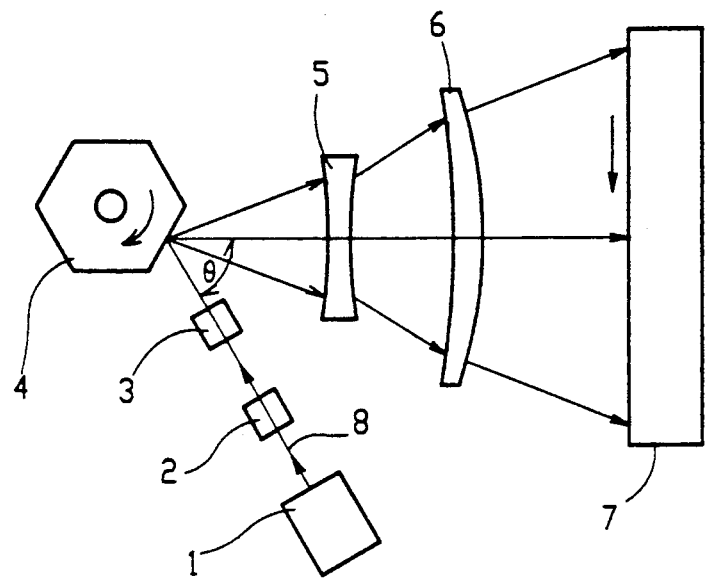
FIG. 1 is a schematic view showing a conventional optical system for use in a laser beam scanner.
Figure 2A:
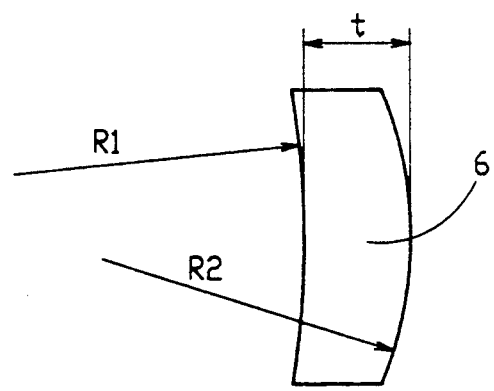
FIGS. 2A and 2B are views showing the radiuses of curvature of a toric lens with a toric surface at a scanning plane and a plane perpendicular to the scanning plane, respectively.
Figure 2B:
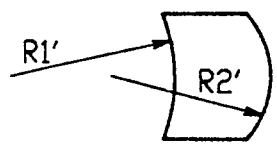

In the manufacturing of the holographic optical element 10 of the compensating lens array, the concave lens 16 and the holographic optical element 10 are attached to each other so as to have the same function as the toric lens 6, as shown in FIG. 1.

That is, the focus length f1 of the toric lens 6 at the scanning plane and the focus length f2 of the foric lens 6 at the plane perpendicular to the scanning plane can be expressed as follows:

$$\frac{1}{f1} = (N - 1)\left[\frac{1}{R1} - \frac{1}{R2} + \frac{t(N-1)}{R1R2N}\right] \quad (1)$$

$$\frac{1}{f2} = (N - 1)\left[\frac{1}{R1'} - \frac{1}{R2'} + \frac{t(N-1)}{R'1R'2N}\right] \quad (2)$$

Thus, the holographic optical element 10 has to be manufactured such that it has a power (an inverse number of the focus length) which satisfies the above equations (1) and (2) when the holographic optical element 10 is coupled to the convex lens 16.

Figure 5A:
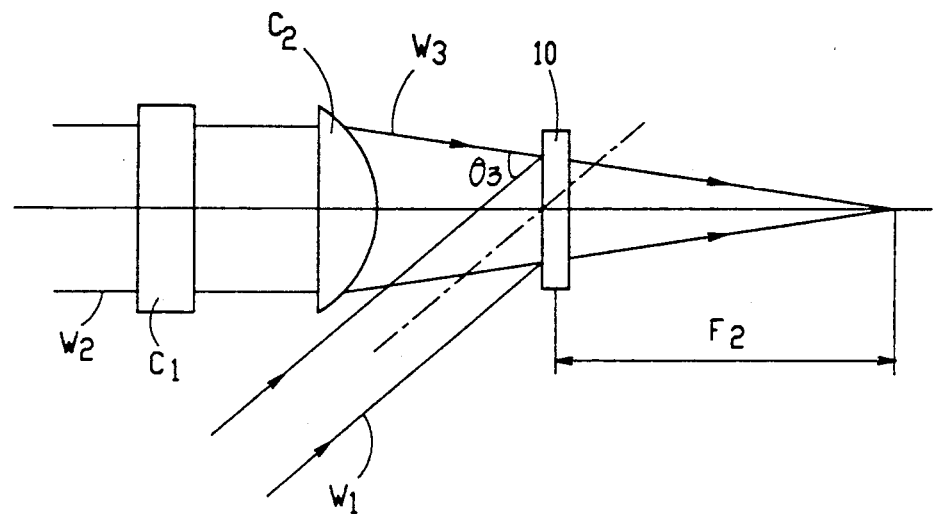
Figure 5B:
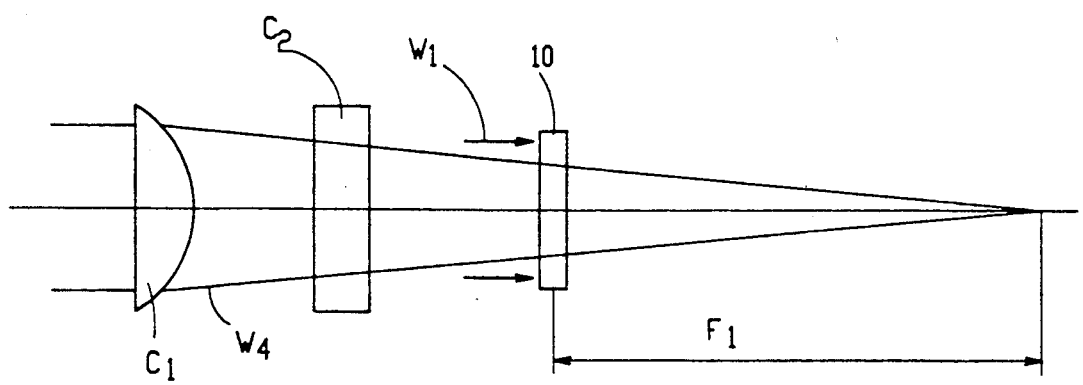

That is, in manufacturing the holographic optical element 10, a first and a second cylindrical lenses C1 and C2 are disposed such that their powers cross at right angles, as shown in FIGS. 5A and 5B, the distance F1 between the focus of the first cylindrical lens C1 and the holographic optical element 10 comes to a half of the radius of curvature R1 of the toric lens at the scanning plane, and the distance F2 between the focus of the second cylindrical lens C2 and the holographic optical element comes to a half of the radius of curvature R1' of the toric lens at a plane perpendicular to the scanning surface. Thus, when the holographic optical element 10 is attached to the convex lens 16, the following equations (3) and (4) have to be satisfied.

$$\frac{1}{HF1} = (N - 1)\left[\frac{1}{2F1} - \frac{1}{R2} + \frac{T(N-1)}{2F1R2N}\right] \quad (3)$$

$$\frac{1}{HF2} = (N - 1)\left[\frac{1}{2F2} - \frac{1}{R2'} + \frac{T(N-1)}{2F2R2'N}\right] \quad (4)$$

wherein,
HF1 is a focus length of the holographic optical element at the scanning plane,
HF2 is a focus length of the holographic optical element at a plane perpendicular to the scanning plane,
N is a refractive index of the convex lens,
F1 is a distance between the focus of the first cylindrical lens and the holographic optical element at the scanning plane,
F2 is a distance between the focus of the second cylindrical lens and the holographic optical element at a plane perpendicular to the scanning plane,
T is a thickness of the convex lens,
R2 is a radius of curvature of the convex lens at the scanning plane, and
R2' is a radius of curvature of the convex lens at a plane perpendicular to the scanning plane.

The holographic optical element 10 manufactured as above has a focus length F1 at a scanning plane while a focus length F2 at a plane perpendicular to the scanning plane, and when it is coupled to the convex lens 16, the power of the coupled lens array satisfies the above equations (3) and (4).

In the above, since F1=R1/2 and F2=R1'/2, the equations (3) and (4) are consistence with the equations (1) and (2). Accordingly, the compensating lens array of the present invention has the same optical characteristics as the conventional toric lens.

As shown in FIGS. 5A and 5B, when parallel beams are incident upon the holographic optical element 10 at an angle $\theta 3$, the beams are focused on the position F2 (FIG. 5A) which is perpendicular to the scanning plane and on the position F1 (FIG. 5B) which is in the direction of the scanning plane. That is, the lengths F1 and F2 become focus lengths of the holographic optical element 10 at each direction. In FIGS. 5A and 5B, references W1 and W2 are parallel beams, W3 is a beam which is focused in the direction perpendicular to the scanning plane by virtue of the cylindrical lens C2, W4 is a beam which is focused on the scanning plane by virtue of the cylindrical lens C1, and $\theta 3$ is an angle defined by the focused beam W3 being used as a reference beam. And, the angles $\theta 1$ and $\theta 2$ in FIG. 3 and $\theta 3$ in FIG. 5A are the same each other.

Figure 6A:
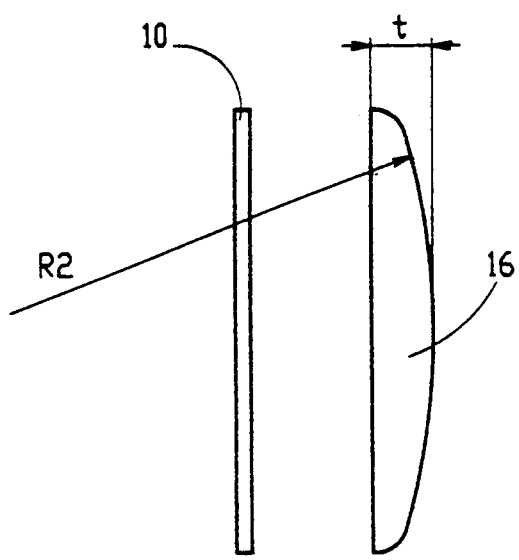
FIGS. 6A and 6B are views showing the radiuses of curvature of a convex lens at a scanning plane and a plane perpendicular to the scanning plane, respectively.
Figure 6B:
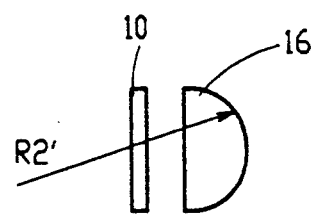

Meanwhile, the holographic optical element 10 and the convex lens 16 are joined together by means of an ultraviolet adhesive doped therebetween. In FIG. 6, reference T is a thickness of the convex lens 16, N is a refractive index of the convex lens 16, and R2 is a radius of curvature of the convex lens 16.

Moreover, the light source 11, the rotary polyhedron 14 and the compensating lens array are disposed such that the laser beam from the light source 11 is incident upon the rotary polyhedron below the scanning plane at a predetermined angle $\theta 1$ with respect to the scanning plane and the laser beam reflected at the rotary polyhedron 14 is incident upon the holographic optical element 10 at a predetermined angle $\theta 2$ via the convave lens 15.

The optical system for use in a laser beam scanner of the present invention operates as follows:

A laser beam emitted from the light source 11 is collimated by the collimator 12 and is incident upon the rotary polyhedron 14 at a predetermined angle $\theta 1$ by virtue of the cylindrical lens 13. The laser beam reflected at the surface of the rotary polyhedron is incident upon the concave lens 15 of the compensating lens array and passes through the holographic optical element 10 attached to the convex lens 16 and then scanned on the drum 17.

At this moment, the compensating lens array including the concave lens 15, the holographic optical element 10 and the convex lens 16 coupled to the holographic optical element 10 prevents the laser beam from slightly moving in the direction perpendicular to the scanning plane due to the gradient of the mirror surface of the rotary polyhedron 14 and maintains the scanning speed of the laser beam on the drum 17 uniform.

As described above in detail, the present invention provides the effect that it is possible to reduce the manufacturing cost of the optical system by use of a holographic optical element instead of an expensive toric lens.

The invention being thus described, it will be obvious that the same may be varied in many ways. Such variations are not to be regarded as a departure from the spirit and scope of the invention, and all such modifications would be obvious to one skilled in the art are intended to be included in the scope of the following claims.

What is claimed is:

1. An optical system for a laser beam scanner, comprising:
   a light source for generating a laser beam,
   a rotary polyhedron for directing the laser beam from said light source to a compensating lens array,
   said compensating lens array including a concave lens for receiving the laser beam from said rotary polyhedron and a convex lens attached with a holographic optical element for compensating the laser beam reflected from the rotary polyhedron and scanning the compensated laser beam to a drum, and
   wherein said holographic optical element is manufactured using a first and a second cylindrical lens having powers which cross at right angles and the holographic element is attached to the convex lens so as to satisfy the equations $$\frac{1}{HF1} = (N - 1)\left[\frac{1}{2F1} - \frac{1}{R2} + \frac{T(N-1)}{2F1R2N}\right]$$

and $$\frac{1}{HF2} = (N - 1)\left[\frac{1}{2F2} - \frac{1}{R2'} + \frac{T(N-1)}{2F2R2'N}\right]$$

where, HF1 is a focus distance of the holographic optical element at the scanning plane, HF2 is a focus distance of the holographic optical element at a plane perpendicular to the scanning plane, N is a refractive index of the convex lens, F1 is a distance between the focus of the first cylindrical lens and the holographic optical element at the scanning plane, F2 is a distance between the focus of the second cylindrical lens and the holographic optical element at a plane perpendicular to the scanning plane, T is a thickness of the convex lens, R2 is a radius of curvature of the convex lens at the scanning plane, and R2' is a radius of curvature of the convex lens at a plane perpendicular to the scanning plane.

2. The optical system of claim 1, wherein said convex lens and said holographic optical element are coupled by means of an ultraviolet adhesive.

3. The optical system of claim 1, wherein the light source, the rotary polyhedron and the compensating lens array are arranged such that the laser beam from the light source is incident upon the rotary polyhedron below the scanning plane at a predetermined angle with respect to the scanning plane and the laser beam reflected from the rotary polyhedron is incident upon the holographic optical element at a predetermined angle via the concave lens.

* * * * *